US012779656B2

(12) United States Patent
Esenwein

(10) Patent No.: US 12,779,656 B2
(45) Date of Patent: Nov. 3, 2026

(54) LID DEVICE FOR A MATERIAL COLLECTION CONTAINER AND MATERIAL COLLECTION DEVICE, HAND-HELD POWER TOOL AND MATERIAL DISPOSAL UNIT WITH SUCH A LID DEVICE

(71) Applicant: Robert Bosch GmbH, Stuttgart (DE)

(72) Inventor: Florian Esenwein, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 687 days.

(21) Appl. No.: 18/332,916

(22) Filed: Jun. 12, 2023

(65) Prior Publication Data

US 2023/0398676 A1 Dec. 14, 2023

(30) Foreign Application Priority Data

Jun. 14, 2022 (DE) ..................... 10 2022 206 011.3
Jun. 9, 2023 (DE) ..................... 10 2023 205 361.6

(51) Int. Cl.
*B25F 5/02* (2006.01)
*B23Q 11/00* (2006.01)

(52) U.S. Cl.
CPC ............ *B25F 5/02* (2013.01); *B23Q 11/0071* (2013.01)

(58) Field of Classification Search
CPC ............................... B25F 5/02; B23Q 11/0071
See application file for complete search history.

(56) References Cited

U.S. PATENT DOCUMENTS 5,941,765 A * 8/1999 Taylor ................... B24B 55/102 451/357
7,497,886 B2 * 3/2009 Walker ............... B23Q 11/0071 451/453
10,045,671 B2 * 8/2018 Wiedemann .......... A47L 7/0095
2008/0209739 A1 * 9/2008 Saitoh .................. B23D 59/006 30/124

(Continued)

FOREIGN PATENT DOCUMENTS

DE 10 2013 215 788 A1 2/2015
DE 102015225375 A1 * 6/2017 ............... B27G 3/00

(Continued)

OTHER PUBLICATIONS

JP-2009220215-A—English Machine Translation (Year: 2009).*

*Primary Examiner* — Marc Carlson
(74) *Attorney, Agent, or Firm* — Maginot, Moore & Beck LLP

(57) ABSTRACT

A lid apparatus for a material collection container includes at least one lid unit for at least partially closing a material collection opening of the material collection container; at least one container fixation interface arranged on the lid unit (16*a*; 16*b*; 16*c*), by means of which the lid unit can be reversibly detached and fastened on the material collection container, in particular without tools; and at least one hand-held power tool interface arranged on the lid unit for fastening the lid unit on a hand-held power tool, in particular a discharge nozzle of the hand-held power tool. The lid apparatus further includes at least one further fixation interface, by means of which a material disposal unit can be reversibly detached and fastened on the lid unit, in particular without tools.

19 Claims, 6 Drawing Sheets

(56) References Cited

U.S. PATENT DOCUMENTS

| | | | | |
|---|---|---|---|---|
| 2012/0034856 | A1 * | 2/2012 | Yamashiro | B24B 55/102<br>451/453 |
| 2013/0115863 | A1 * | 5/2013 | Mizutani | B24B 55/10<br>15/246 |
| 2023/0398676 | A1 * | 12/2023 | Esenwein | B23Q 11/0071 |

FOREIGN PATENT DOCUMENTS

| | | | | | |
|---|---|---|---|---|---|
| DE | 10 2020 209 074 | A1 | | 1/2022 | |
| DE | 102020213230 | A1 | * | 4/2022 | B25F 5/02 |
| EP | 0279047 | A1 | * | 8/1988 | B24B 55/10 |
| JP | 2009220215 | A | * | 10/2009 | |

* cited by examiner

LID DEVICE FOR A MATERIAL COLLECTION CONTAINER AND MATERIAL COLLECTION DEVICE, HAND-HELD POWER TOOL AND MATERIAL DISPOSAL UNIT WITH SUCH A LID DEVICE

This application claims priority under 35 U.S.C. § 119 to patent application number DE 10 2022 206 011.3, filed on Jun. 14, 2022 in Germany, and to patent application number DE 10 2023 205 361.6, filed on Jun. 9, 2023 in Germany, the disclosures of which are incorporated herein by reference in their entirety

BACKGROUND

DE 10 2020 213 230 A1 has already proposed a lid apparatus for a material collection container, having a lid unit for at least partially closing a material collection opening of the material collection container. The lid apparatus comprises a container fixation interface arranged on the lid unit, by means of which the lid unit can be reversibly detached and fastened on the material collection container. The lid apparatus comprises a hand-held power tool interface arranged on the lid unit for fastening the lid unit to a hand-held power tool, in particular a discharge nozzle of the hand-held power tool.

SUMMARY

The disclosure relates to a lid apparatus for a material collection container, having at least one lid unit for at least partially closing a material collection opening of the material collection container, having at least one container fixation interface arranged on the lid unit, by means of which the lid unit can be reversibly detached and fastened on the material collection container, in particular without tools, having at least one hand-held power tool interface arranged on the lid unit for fastening the lid unit on a hand-held power tool, in particular a discharge nozzle, of the hand-held power tool.

It is proposed that the lid apparatus comprises at least one further fixation interface, by means of which a material disposal unit can be reversibly detached and fastened on the lid unit, in particular without tools. The further fixation interface is preferably provided in order to fasten the material disposal unit instead of the material collection container to the lid apparatus. For example, the material disposal unit is an alternative material collection container having at least one counter-interface compatible with the further fixation interface, in particular instead of a counter-interface compatible with the container fixation interface. A counter-interface that is "compatible" with an interface is preferably to be understood as a functionally compatible counter-interface, which cooperates with the interface in order to enable a resilient fastening of two components to one another, in particular at least with respect to a dead weight of the components. For example, the material disposal unit can comprise a hose, in particular at least one hose nozzle, in particular configured as a vacuum cleaner having a counter-interface compatible with the further fixation interface, in particular instead of a counter-interface compatible with the container fixation interface. The lid apparatus is preferably provided for a rigid connection of the hand-held power tool to the material collection container or the material disposal unit, in particular at least a hose of the material disposal unit, in particular for an automatic entrainment of the material collection container or the material disposal unit, in particular at least a hose of the material disposal unit, during a movement of the hand-held power tool.

The lid apparatus is preferably provided in order to guide the material along a provided trajectory from the hand-held power tool fastened to the lid apparatus by means of the hand-held power tool interface, in particular the discharge nozzle, to the material collection container fastened to the lid apparatus by means of the container fixation interface, or to the material disposal unit fastened by means of the further fixation interface. Along the provided trajectory, the lid unit preferably comprises an inlet opening for receiving the material from the hand-held power tool and an outlet opening for ejecting the material from the lid apparatus, in particular into the material collection container or into the material disposal unit. In planes perpendicular to the provided trajectory, the provided trajectory is preferably enclosed by the lid unit, in particular to avoid a leakage of material from the lid apparatus transverse to the provided trajectory.

The lid unit preferably comprises an in particular annular central wall, which bounds the outlet opening. The lid unit preferably comprises an outlet center axis that runs perpendicular to a main extension plane of the central wall. The outlet opening preferably has a maximum opening width in a plane parallel to the main extension plane and perpendicular to the outlet center axis. The outlet center axis preferably passes through a geometrical center of gravity of the central wall. A "main extension plane" of a structural unit is in particular intended to be understood as a plane which is parallel to a largest side surface of a smallest notional cuboid which just completely encloses the structural unit, and in particular runs through the midpoint of the cuboid.

The lid unit preferably comprises at least one fixation wall portion arranged on the central wall, on which the container fixation interface is arranged. The lid unit preferably comprises at least one, in particular the aforementioned or a further one, fixation wall portion, on which the further fixation interface is arranged. The lid unit preferably comprises at least one hand-held power tool-side wall portion arranged on the central wall, on which the hand-held power tool interface is arranged. The at least one fixation wall portion, in particular all fixation wall portions, and the hand-held power tool-side wall portion are preferably arranged on different sides of the central wall with respect to the outlet center axis.

The inlet opening is preferably formed by the hand-held power tool-side wall portion. The inlet opening is preferably smaller than the outlet opening, in particular so that the outlet opening is closed partially, in particular entirely, with the exception of the inlet opening, by the hand-held power tool-side wall portion. The inlet opening is preferably arranged acentrically relative to the outlet center axis. A plane in which the inlet opening lies preferably runs transverse to the main axis of extension of the central wall. Preferably, when viewing the hand-held power tool-side wall portion from a direction parallel to the outlet center axis, the hand-held power tool-side wall portion completely covers, alternatively at least 50%, preferably at least 75%, in particular greater than 90% of the outlet opening. The hand-held power tool interface preferably comprises an inlet center axis. The inlet center axis preferably extends at least substantially perpendicular to the plane comprising the inlet opening and preferably through a geometrical midpoint of the inlet opening. The outlet center axis and the inlet center axis preferably extend transverse, preferably askew, to each other. Alternatively, the outlet center axis and the inlet center axis intersect at, in particular exactly, one point. A maximum transverse extension of the hand-held power tool-side wall portion perpendicular to the inlet center axis increases preferably continuously or in a plurality of steps from the inlet opening starting along the inlet center axis up to the central wall. Particularly preferably, the hand-held power tool-side wall portion is conical in shape.

Particularly preferably, the hand-held power tool interface is arranged within the lid unit on the hand-held power tool-side wall portion. Alternatively, the hand-held power tool interface projects through the lid unit, in particular the inlet opening. Alternatively, the hand-held power tool interface is arranged outside the lid unit on the hand-held power tool-side wall portion. The hand-held power tool interface and a material discharge opening of the hand-held power tool, in particular the discharge nozzles, are preferably provided so as to be arranged concentrically with respect to the inlet center axis. Particularly preferably, the hand-held power tool interface is provided so as to receive a structural element forming the material discharge opening, in particular the discharge nozzle, of the hand-held power tool. Alternatively, the hand-held power tool interface is provided so as to be arranged within the material discharge opening, in particular within the discharge nozzle. The hand-held power tool interface preferably comprises a hollow cylindrical connector element, in particular wherein a cylinder axis of the connector element is equal to the inlet center axis, which is provided for direct contact with the discharge nozzle of the hand-held power tool. Particularly preferably, the connector element has an annular, alternatively oval or polygonal, profile in a plane perpendicular to the inlet center axis. Alternatively, the hand-held power tool interface comprises a plurality of connector elements for direct contact with the structural element forming the material discharge opening, in particular the discharge nozzle, which are preferably arranged rotationally symmetrically with respect to the inlet center axis. Particularly preferably, in a state when fastened to the hand-held power tool, the lid apparatus is arranged pivotally on the hand-held power tool, in particular the discharge nozzle, with respect to the inlet center axis on the hand-held power tool. Alternatively, in a state when fastened to the hand-held power tool, the lid apparatus is arranged rotationally on the hand-held power tool, in particular the discharge nozzle, with respect to the inlet center axis. The lid apparatus can preferably be reversibly detached and fastened to the hand-held power tool by means of the hand-held power tool interface, in particular without tools. Particularly preferably, the hand-held power tool interface is provided in order to establish a frictional lock and/or a positive lock with the structural element forming the material discharge opening, in particular the ejection nozzle, of the hand-held power tool, in a direction parallel to the inlet center axis. Optionally, the hand-held power tool, in particular on an inner wall or an outer wall of the connector element, comprises a corrugation, elastic structural elements, or the like, in order to adjust a necessary assembly force to fasten the lid apparatus to the hand-held power tool or in order to increase a necessary disassembly force to release the lid apparatus from the hand-held power tool, in particular against a smooth wall. Alternatively or additionally, the hand-held power tool interface comprises at least one of a detent element, a clamping element, a screwing element, or the like in order to fasten the lid apparatus to the hand-held power tool.

When it is stated that an interface is "reversibly" detachable and fastenable, it should preferably be understood that a connection of this interface to a counter-interface provided for the interface can be produced and detachable without functional loss at least 10 times, preferably greater than 50 times, particularly preferably greater than 100 times, in particular without tools, in particular non-destructively. The term "substantially perpendicular" is understood here in particular to mean an orientation of a direction relative to a reference direction, wherein the direction and the reference direction, in particular as viewed in a projection plane, enclose an angle of 90°, and the angle has a deviation of in particular less than 8°, advantageously less than 5°, and in particular advantageously less than 2°. The term "substantially (in) parallel" is in particular intended here to be understood to mean an orientation of a direction relative to a reference direction, in particular in a plane, wherein the direction has a deviation from the reference direction of in particular less than 8°, advantageously less than 5°, and in particular advantageously less than 2°.

Preferably, the at least one fixation wall portion is provided for direct contact with the material collection container or the material disposal unit. The at least one fixation wall portion and the material collection opening of the material collection container are preferably provided so as to be arranged concentrically with respect to the outlet center axis. The at least one fixation wall portion is preferably configured such that the outlet center axis is arranged at least substantially parallel to, in particular overlapping with, a container longitudinal axis of the material collection container in a state when fastened to the material collection container.

Particularly preferably, the at least one fixation wall portion is provided with the container fixation interface and/or with the further fixation interface for reaching through the material collection opening. Alternatively, the container fixation interface is provided in order to receive a structural element of the material collection container forming the material collection opening. The at least one fixation wall portion is preferably tubular, in particular hollow-cylindrical, particularly preferably with a circular annular base surface, wherein the outlet center axis is preferably equal to a cylindrical axis of the at least one fixation wall portion. Preferably, the at least one fixation wall portion has a smaller maximum radial extension than the central wall, in particular such that the material collection container is arranged flush with an outer wall of the central wall, when arranged on the at least one fixation wall portion, in relation to a direction perpendicular to the outlet center axis. A difference between the maximum radial extension of the at least one fixation wall portion and the maximum radial extension of the central wall is preferably less than a five-fold, preferably less than a four-fold, preferably less than a three-fold of a maximum material thickness of the at least one fixation wall portion and/or the central wall. "Radial" is preferably understood to be direction-giving from the outlet center axis with respect to a direction perpendicular to the outlet center axis, and in particular with respect to a direction starting from the outlet center axis. A "radial extension" is preferably an extension starting from the outlet center axis in a direction perpendicular to the outlet center axis. The maximum material thickness of the fixation wall portion and/or the further fixation wall portion is preferably less than 3 mm, particularly preferably less than 2 mm, optionally less than 1.5 mm.

The hand-held power tool-side wall portion, the central wall and the at least one fixation wall portion are preferably formed in one piece. The term "in one piece" is in particular understood to mean shaped in one piece. Preferably, this one piece is produced from a single blank, a mass and/or a cast, particularly preferably in an injection-molding method, in particular a single- and/or multi-component injection-molding method. Particularly preferably, the lid unit is formed integrally with the power tool interface, the container fixation interface, and/or the further fixation interface.

Due to the configuration according to the disclosure, the lid apparatus for the material collection container can advantageously be used in order to connect a material disposal unit to the hand-held power tool. A stand-alone adapter provided for connecting the hand-held power tool to the material collection container including the lid apparatus or to the further material disposal unit can be advantageously omitted. In particular, an advantageously operator-friendly exchange between the use of the material collection container and the material disposal unit can be achieved. Furthermore, an in particular inflexible connection path between the hand-held power tool and the material collection container or the material disposal unit can advantageously be kept low.

Particularly preferably, the further fixation interface forms a snap-fit unit. Particularly preferably, the further fixation interface comprises at least one detent element, preferably two, in particular identical, detent elements, which are preferably arranged on the fixation wall portion or the further fixation wall portion in a rotationally symmetrical manner with respect to the outlet center axis. The at least one detent element is preferably configured as a female detent element, in particular as a recess or breakthrough in the fixation wall portion or the further fixation wall portion. The catching unit is preferably provided for a positive lock of the further fixation interface with the material collection container or the material disposal unit in a direction parallel to the outlet center axis. By forming a snap-fit unit, a further fixation interface can be provided, by means of which a connection to the material disposal unit, in particular a hose of the material disposal unit, can be advantageously simply produced and detached and which is advantageously insensitive to material deposits on the fixation wall portion or the further fixation wall portion.

Furthermore, it is proposed that the further fixation interface be arranged radially within the container fixation interface and axially spaced apart further from the hand-held power tool interface than from the container fixation interface. The further fixation interface preferably has a lower maximum distance to the inlet center axis than the container fixation interface. “Axial” is understood in particular in relation to a direction parallel to the outlet center axis. An “axial extension” is in particular an extension parallel to the outlet center axis. Particularly preferably, the further fixation interface projects parallel to the outlet center axis, in particular entirely beyond the container fixation interface. Preferably, the container fixation interface and the further fixation interface are arranged, in particular completely, on different sides of at least one plane perpendicular to the inlet center axis. Alternatively, the lid apparatus has at least one plane perpendicular to the inlet center axis, which intersects both the container fixation interface and the further fixation interface. The container fixation interface and the further fixation interface are advantageously easily accessible due to the design according to the disclosure.

The lid apparatus comprises a substantially circumferentially closed wall portion, in particular the aforementioned fixation wall portion, on which the container fixation interface and the further fixation interface are arranged on different sides. Particularly preferably, the container fixation interface is arranged on a side facing away from the outlet center axis, in particular an outer wall, of the fixation wall portion. Preferably, the fixation interface is arranged on a side facing the outlet center axis, in particular an inner wall, of the fixation wall portion. In particular, in a configuration of the further fixation interface as a female detent element, a detent inlet opening is arranged through which a male detent element of a counter-interface engages with the female detent element on the side facing the outlet center axis, in particular the inner wall, of the fixation wall portion. The container fixation interface and the further fixation interface are arranged, preferably overlapping, on the fixation wall portion, relative to a direction parallel to the outlet center axis. For example, a female detent element of the further fixation location is arranged between two turns of a threading of the container fixation interface. Alternatively, the threading of the container fixation interface at a position of the female detent element of the further fixation interface is interrupted. Alternatively, the container fixation interface and the further fixation interface are arranged one behind the other in relation to a direction that is parallel to the outlet center axis. When it is stated that a component is “substantially circumferentially closed,” it is understood to mean in particular a component that extends from the outlet center axis, in at least one, preferably in each, cutting plane through the component perpendicular to the outlet center axis, over an accumulated angle of greater than 180°, preferably greater than 270°, particularly preferably greater than 310°, in particular greater than 345°. Particularly preferably, the fixation wall portion is fully closed in the circumferential direction, apart from the female detent elements of the further fixation interface. Alternatively, the fixation wall portion is configured to be slotted, in particular parallel to the outlet center axis. The outlet opening is advantageously kept large by the design according to the disclosure. The fixation interfaces can advantageously be arranged in a compact fashion.

It is further proposed that the lid unit comprises an in particular cylindrical, at least substantially circumferentially closed central wall, in particular the aforementioned central wall, on the outside of which a wall portion for the container fixation interface, in particular the aforementioned fixation wall portion, is arranged, and on the inner side of which a wall portion for the further fixation interfaces, in particular the aforementioned further fixation wall portion, is arranged. The further fixation wall portion is preferably provided for direct contact with the material disposal unit. The further fixation wall portion is preferably tubular, in particular hollow-cylindrical, particularly preferably with a circular annular base surface, wherein the outlet center axis is preferably equal to a cylindrical axis of the further fixation section. Preferably, the further fixation wall portion is configured at least substantially circumferentially closed. Preferably, the fixation wall portion and the further fixation wall portion are arranged radially spaced apart from each other, particularly preferably concentrically with respect to the outlet center axis. The further fixation wall portion is preferably configured such that the outlet center axis is arranged at least substantially parallel to, in particular overlapping with, a container longitudinal axis or a hose center axis of the material disposal unit in a state when the lid apparatus is fastened to the material disposal unit. Particularly preferably, the further fixation wall portion with the further fixation interface is provided for receiving a counter-interface of the material disposal unit, in particular a hose connector of the material disposal unit. Alternatively, an outer wall of the further fixation wall portion is provided so as to be arranged in the material disposal unit, in particular a hose nozzle of the material disposal unit. Due to the design according to the disclosure, an advantageously high elasticity of the fixation wall portions can be achieved so that the fixation interface advantageously has a bias. In particular, an advantageously secure fastening of the lid apparatus to the material collection container or the material disposal unit can be achieved. Furthermore, a risk of material deposits on the fixation wall portion, and in particular on the container fixation interface, can advantageously be kept low.

Furthermore, it is proposed that the wall portion for the container fixation interface has an axial extension that is smaller than the axial extension of the wall portion for the further fixation interfaces, and/or that the wall portion for the container fixation interface has a radial distance from an outlet center axis of the lid unit that is greater than the distance from the wall portion for the further fixation interfaces. Preferably, an inner wall of the further fixation wall portion bounds the outlet opening in a plane perpendicular to the outlet center axis. In particular, the inner wall of the further fixation wall portion is an in particular continuous extension of an inner wall of the central wall parallel to the outlet center axis. Preferably, the maximum axial extension of the further fixation wall portion is greater than twice, preferably greater than three times, as long as the maximum axial extension of the fixation wall portion. Preferably, the maximum axial extension of the further fixation wall portion is less than ten times, preferably less than seven times, as long as the maximum axial extension of the fixation wall portion. Preferably, the maximum axial extension of the further wall portion is at least less than 75%, preferably less than 60%, particularly preferably less than 50% of a maximum total axial extension of the lid apparatus parallel to the outlet center axis. Preferably, the maximum axial extension of the further fixation wall portion is at least greater than 15%, preferably greater than 20%, particularly preferably greater than 30%, in particular greater than 40% of the maximum axial total extension of the lid apparatus parallel to the outlet center axis. Particularly preferably, the fixation wall portion surrounds the further fixation wall portion in at least one plane perpendicular to the outlet center axis. Preferably, the further fixation wall portion projects parallel to the outlet center axis beyond the wall portion. Due to the design according to the disclosure, the fixation interfaces can advantageously be arranged in a compact manner. Furthermore, an advantageously simpler access to the further fixation interface can be achieved. Furthermore, a risk that one of the fixation interfaces will attach to the material can be advantageously kept low.

Furthermore, it is proposed that a minimum distance between the wall portions, in particular in the radial direction, is smaller than a minimum distance of the wall portion and/or the further wall portion of an outlet center axis of the lid unit, in particular the aforementioned one. The fixation wall portion and the further fixation wall portion preferably project parallel to each other from the central wall. The distance between the fixation wall portion and the further fixation wall portion is preferably smaller than three times, preferably smaller than twice, particularly preferably smaller than or equal to one times of a material thickness of the fixation wall portion and the further fixation wall portion perpendicular to the outlet center axis. Preferably, the distance of the further fixation wall portion and/or the fixation wall portion from the outlet center axis is greater than three times as large, preferably greater than five times as large, particularly preferably greater than seven times the distance between the fixation wall portion and the further fixation wall portion. Preferably, the distance of the further fixation wall portion from the outlet center axis is greater than 13 mm, preferably greater than 16 mm, particularly preferably greater than 19 mm, optionally greater than 22 mm. As a result of the design according to the disclosure, the outlet opening can advantageously be kept large. In particular, a receiving volume of the material collection container can advantageously be used effectively.

Preferably, a maximum opening width of the lid unit, in particular the outlet opening, is greater than a maximum opening width of the hand-held power tool interface in order to allow passage of the material bounded by the central wall. As a result, a flow resistance of the lid apparatus can advantageously be kept low. Particularly preferably, the outlet opening has the maximum opening width of the lid unit perpendicular to the outlet center axis. Preferably, the inlet opening has the maximum opening width of the hand-held power tool interface perpendicular to the inlet center axis. The maximum opening width of the lid unit is preferably at least 25%, preferably greater than 33%, greater than 50% larger than the maximum opening width of the hand-held power tool interface. The maximum opening width of the lid unit is preferably less than four times as large, preferably less than three times as large, particularly preferably less than twice as large as the maximum opening width of the hand-held power tool interface. The maximum opening width of the hand-held power tool interface is preferably between 15 and 45 mm, particularly preferably between 20 and 35 mm, particularly preferably between 25 and 30 mm. The maximum opening width of the lid unit is preferably greater than 26 mm, preferably greater than 32 mm, particularly preferably greater than 38 mm, optionally greater than 44 mm.

It is further proposed that the container fixation interface and the further fixation interface are configured differently, in particular wherein the container fixation interface is configured as a threading, in particular as an external threading, and the further fixation interface is configured as a snap-fit positive lock. The container fixation interface and the further fixation interface are preferably of different designs. Examples of types of fixation interfaces include, for example, a detent connection, a twist lock, a plug connection, a bayonet lock, a magnetic lock, or the like. Preferably, the container fixation interface is configured as a threading. Particularly preferably, the container fixation interface is configured as an external threading, which is arranged on an outer wall of the fixation wall portion facing away from the outlet center axis. Alternatively, the container fixation interface is configured as an internal threading, which is arranged on an inner wall of the fixation wall portion facing the outlet center axis, for example. The further fixation interface is preferably configured as a detent connection, in particular as the snap-fit unit described above. Alternatively, the container fixation interface and the further fixation interface are of the same design. Due to the configuration according to the disclosure, an allocation of the material collection container and/or the material disposal unit to the fixation interface provided for them can be advantageously intuitively detected. Furthermore, the fixation interfaces can advantageously be optimized with respect to various minor aspects in addition to the fastening of the material collection container and/or the material disposal unit. For example, the container fixation interface can be advantageously designed tightly. For example, the further fixation interface can advantageously be designed to be easily accessible.

Furthermore, it is proposed that the lid apparatus comprises at least one guide groove leading from an opening plane of the lid unit to the further fixation interface. The opening plane is preferably perpendicular to the outlet center axis. The opening plane preferably limits an axial extension of the fixation wall portion on which the further fixation interface is arranged. The guide groove is preferably arranged on a side facing the outlet center axis, in particular an inner wall, of the fixation wall portion or the further fixation wall portion. The guide groove preferably leads from the opening plane to the further fixation interface, in particular to one of the female detent elements of the further fixation interface. The guide groove is preferably provided in order to guide a male detent element of the material disposal unit from the opening plane to one of the female detent elements. Preferably, the guide groove narrows from the opening plane towards the further fixation interface. Preferably, an opening width of the guide groove at the opening plane parallel to an inner wall of the fixation wall portion or of the further fixation wall portion is larger than an opening width of the female detent elements of the further fixation interface. The guide groove is in particular configured as a trapezoidal recess. Preferably, the guide groove from the opening plane to the further fixation interface forms a ramp so that the guide groove at the further fixation interface has a lower depth than at the opening plane. Due to the configuration according to the disclosure, the material disposal unit can advantageously be arranged simply at the further fixation interface. In particular, an alignment of the material disposal unit relative to the further fixation interface can be advantageously achieved.

Furthermore, it is proposed that the lid apparatus comprises an adjustable air bypass for adjusting a flow resistance of the lid unit. Preferably, the air bypass is formed from a breakthrough through the power tool-side wall portion and/or through the central wall. Preferably, the air bypass is arranged between the hand-held power tool interface and the container fixation interface. Alternatively, the air bypass is formed from a breakthrough through the fixation wall portion. Preferably, the lid apparatus comprises a closure element for partially or completely closing and opening the air bypass. The closure element is preferably slidably or rotatably stored on the lid unit. Alternatively or additionally, the closure element is reversibly detachable from the lid unit and fastenable to the lid unit. Preferably, the air bypass is continuously adjustable by means of the closure element. Alternatively, the closure element, in particular by means of a detent connection, can be fixed to the lid unit in a plurality of predefined positions relative to the air bypass. Due to the design according to the disclosure, a negative pressure in the lid apparatus can advantageously be easily adjusted when using a vacuum cleaner as the material disposal unit.

It is further proposed that the lid apparatus comprises a substantially circumferentially closed fixation wall portion, in particular the aforementioned one, in particular the aforementioned further fixation wall portion, on which the container fixation interface and/or the further fixation interface is/are arranged and which forms an air bypass. This air bypass is further referred to as an internal air bypass on the power tool-side wall portion and/or on the central wall for differentiating from the air bypass described in the previous section. The lid apparatus can comprise the internal air bypass alternatively or in addition to the air bypass on the power tool-side wall portion and/or on the central wall. The internal air bypass is preferably formed by a recess of the fixation wall portion, in particular the further fixation wall portion, that is different from the container fixation interface and/or the further fixation interface. With respect to the container fixation interface and/or the further fixation interface, the internal air bypass has a minimum angular distance of greater than 15°, preferably greater than 30°, particularly preferably greater than 45°, in a plane perpendicular to the outlet center axis with the outlet center axis as the apex. With respect to the container fixation interface and/or with respect to the further fixation interface, the internal air bypass has a minimum angular distance of less than 165°, preferably less than 150°, particularly preferably less than 135° in a plane perpendicular to the outlet center axis with the outlet center axis as the apex. The internal air bypass and at least a majority of the hand-held power tool interface or the complete hand-held power tool interface are preferably arranged in different halves of the lid apparatus relative to at least one cutting plane comprising the outlet center axis. The internal air bypass is preferably formed by at least one, particularly preferably exactly one, slot-shaped air bypass recess of the fixation wall portion, in particular the further fixation wall portion. The air bypass recess preferably extends from the opening plane of the lid unit, starting at least substantially parallel to the outlet center axis. Particularly preferably, a maximum longitudinal extension of the air bypass recess parallel to the outlet center axis is greater than a maximum opening width of the air bypass recess in a plane perpendicular to the outlet center axis. Particularly preferably, a maximum longitudinal extension of the air bypass recess extends parallel to the outlet center axis over at least a substantial proportion of a parallel maximum longitudinal extension of the fixation wall portion, in particular the further fixation wall portion. A “substantial portion” of a reference quantity is preferably understood to mean at least 25%, preferably at least 33%, particularly preferably at least 50% of the reference quantity. The air bypass recess has an opening width of less than 60°, preferably less than 45°, particularly preferably less than 350 in a plane perpendicular to the outlet center axis with respect to the outlet center axis. The internal air bypass preferably has an opening width of greater than 25°, preferably greater than 20°, particularly preferably greater than 15° in a plane perpendicular to the outlet center axis with respect to the outlet center axis. Due to the embodiment according to the disclosure, a risk of accidental leaving the internal air bypass open can be advantageously avoided. Moreover, movable parts can be omitted, whereby the lid apparatus can advantageously be configured in a low-wear manner. In particular, the internal air bypass can be advantageously simply and inexpensively realized.

Furthermore, it is proposed that the hand-held power tool interface comprises a base body made of a base material and at least one fastening element, which is arranged on the base body and is made of an in particular thermoplastic elastomeric material that is different than the base material. The base body is preferably formed integrally with the hand-held power tool-side wall portion. The fastening element is preferably provided for direct contact with the hand-held power tool, in particular the discharge nozzle. The fastening element is preferably provided so as to be clamped between the base body and the hand-held power tool, in particular the discharge nozzle, during assembly of the lid apparatus on the hand-held power tool. Particularly preferably, the fastening element has an interference fit with respect to the discharge nozzle, in particular such that when the lid apparatus is assembled on the hand-held power tool, a force for compressing the fastening element must be applied. The elastomer is preferably a thermoplastic polyamide elastomer (TPA), alternatively a thermoplastic copolyester elastomer (TPC), a thermoplastic olefin-based elastomer (TPO), a thermoplastic styrenic block copolymer (TPS), a thermoplastic urethane-based elastomer (TPU), a thermoplastic vulcanizate or cross-linked thermoplastic olefin-based elastomer (TPV), or another thermoplastic elastomer (TPZ). Due to the design according to the disclosure, the lid apparatus can advantageously be easily mounted and disassembled on/from the hand-held power tool. In particular, an amount of force to assemble and disassemble the lid apparatus on/from the hand-held power tool can be advantageously kept low. Furthermore, in particular without an additional risk of wear, an advantageously stable base material for the base body can be selected.

Moreover, it is proposed that the fastening element forms a substantially circumferentially closed inner lining of the base body. The fastening element preferably forms the inner lining of the base body circumferentially with respect to the inlet center axis. The fastening element is preferably arranged within the connector element. The fastening element extends parallel to the inlet center axis preferably over a substantial proportion of a maximum longitudinal extension of the connector element parallel thereto. As an alternative to a substantially closed inner lining, the fastening element is configured as a land, a pin, a nub, or the like. In the alternative embodiment, the hand-held power tool interface preferably comprises a plurality of fastening elements, in particular identical in construction, which are arranged in a rotationally symmetrical fashion via an inner wall of the base body, in particular of the connector element, in particular with respect to the inlet center axis. Alternatively, the hand-held power tool interface comprises a substantially circumferentially closed inner lining of the base body, on which the fastening element, in particular a plurality of fastening elements, of the hand-held power tool interface, is/are arranged, wherein the at least one fastening element comprises a recess or other shape element, in particular a radial groove, of the discharge nozzle and forms a positive seal for an axial fastening. As a result of the design according to the disclosure, the hand-held power tool interface can advantageously be configured so as to be dust-tight. Furthermore, a risk of loosening of the fastening element during operation of the hand-held power tool can be advantageously kept low.

Furthermore, it is proposed that the hand-held power tool interface comprises at least one contact element of an electrically conductive material for dissipating an electrostatic charge. The contact element is preferably made of a carbon fiber-reinforced plastic. For example, the plastic is a polyamide having a carbon fiber content of at least 10%, preferably at least 15%, particularly preferably at least 20% based on a total weight and/or total volume of the plastic. Preferably, the at least one contact element is configured as a structural element that protrudes from the base body of the hand-held power tool interface, in particular in the direction of the inlet center axis. The at least one contact element is preferably formed in a rod-like fashion. The lid apparatus preferably comprises at least one conductive element, which electrically connects the contact element to the further fixation interface, in particular for dissipating the electrostatic charge via a hose connected to the further fixation interface. The contact element is preferably provided for direct physical contact with the hand-held power tool, in particular an electrical counter-contact element of the hand-held power tool. The at least one fastening element preferably comprises at least one recess, in which the contact element is arranged and/or through which the contact element reaches. Preferably, the hand-held power tool interface comprises a plurality of in particular identical contact elements that are distributed on the base body, in particular in a rotationally symmetrical manner with respect to the center axis. Due to the embodiment according to the disclosure, advantageously high personal protection and/or advantageously high protection of the hand-held power tool can be achieved. Furthermore, the contact element can be formed in order to be of advantageously low weight, advantageously inexpensive, and advantageously robust.

In addition, a material collection apparatus for a hand-held power tool is proposed, which comprises a lid apparatus according to the disclosure and a material collection container, in particular the aforementioned one, for receiving material discharged by the hand-held power tool. The material collection container preferably comprises a sump tank for collecting the material and a connector unit fastened to the sump tank for fastening of the sump tank to the lid apparatus. The sump tank can be configured as a rigid container, in particular as a container made of a thermoplastic, or a textile container, in particular with or without a shaping support structure. Particularly preferably, the container is cylindrical. The sump tank can be clamped, screwed, glued, welded, or otherwise fastened to the connector unit to the connector unit. The connector unit is preferably annular. An internal central wall of the connector unit preferably bounds the material collection opening. The connector unit preferably comprises at least one counter-interface, which preferably cooperates with the container fixation interface, alternatively with the further fixation interface, in order to fasten the lid apparatus to the connector unit. Preferably, the counter-interface comprises a counter-threading corresponding to the container fixation interface. Alternatively, the counter-interface comprises at least one, preferably at least two, detent lug(s) corresponding to the further fixation interface. The material collection container preferably comprises a maximum longitudinal extension and a maximum transverse extension perpendicular thereto, in particular a maximum diameter. Preferably, a maximum transverse extension of the connector unit and a maximum transverse extension parallel thereto of the sump tank is at least substantially equal in size, in particular different in size by less than 25%, preferably by less than 10%. Preferably, the maximum transverse extension of the material collection container is less than 50%, preferably less than 30%, particularly preferably less than 10%, larger than a parallel opening width of the material collection opening. Due to the design according to the disclosure, the material collection apparatus can advantageously be used in order to connect a material disposal unit to a hand-held power tool. In particular, a separate adapter that is compatible with the material disposal unit and the material collection container can be omitted.

Furthermore, a hand-held power tool, in particular a sander, preferably an eccentric, oscillating, or multi-sander, and/or a material disposal unit, in particular a vacuum cleaner, preferably a vacuum cleaner hose nozzle, is proposed, comprising a lid apparatus or a material collection apparatus according to the disclosure. The hand-held power tool preferably comprises a tool mount for receiving a tool. Optionally, the hand-held power tool comprises the tool for machining a part. The hand-held power tool preferably comprises a power unit for driving the tool mount. For example, the power unit comprises an electric motor and/or a pneumatic drive. The hand-held power tool preferably comprises a housing in which the power unit is arranged. The tool holder is preferably arranged at least partially in the housing. The hand-held power tool can preferably be held with one hand, and can particularly preferably be operated by one hand. Preferably, the housing forms a handle or a handle surface. Preferably, the housing comprises a power supply interface for connecting an energy reservoir, in particular an electrical accumulator, for supplying power to the power unit. The housing preferably forms the material discharge opening. The material discharge opening is preferably provided for a transport of material away from the part, which is removed from the part when the part is machined by means of the tool. The material can be dust, chips, splinters, fragments, or the like. Particularly preferably, the housing forms an ejection nozzle comprising the material discharge opening. The lid apparatus or the material collection apparatus are preferably arranged so as to be reversibly detached from and fastened to the discharge nozzle, in particular to entrain the lid apparatus or the material collection apparatus, upon movement of the hand-held power tool to machine the part. The material disposal unit preferably comprises a hose for transporting the material away. The material disposal unit preferably comprises a hose connector unit, in particular a hose nozzle, for fastening the hose to the lid apparatus. The material disposal unit preferably comprises a vacuum unit, in particular a motor-operated ventilator or compressor, for generating a negative pressure at an end of the hose facing away from the hose connector unit relative to an end of the hose at which the hose connector unit is arranged. The hose connector unit preferably comprises a hose counter-interface, which preferably cooperates with the further fixation interface, alternatively with the container fixation interface, for fastening the lid apparatus to the hose connector unit. Preferably, the hose counter-interface comprises at least one, preferably at least two, detent lug(s) that fit the further fixation interface. Alternatively, the hose counter-interface comprises a counter-threading corresponding to the container fixation interface. Due to the design according to the disclosure, the hand-held power tool can advantageously be simply combined with a material disposal unit or a material collection container. In particular, a separate adapter that is compatible with the material disposal unit and the material collection container can be omitted.

The lid apparatus according to the disclosure, the material collection apparatus according to the disclosure, and/or the hand-held power tool according to the disclosure is/are not intended to be limited to the above-described application and embodiment. In order to fulfill a functionality described herein, the lid apparatus according to the disclosure, the material collection apparatus according to the disclosure, the hand-held power tool according to the disclosure, and/or the material disposal unit according to the disclosure can in particular comprise a number of individual elements, components, and units that deviates from a number mentioned herein. Moreover, in the case of the value ranges specified in this disclosure, values lying within the mentioned limits are also to be considered as disclosed and usable as desired.

BRIEF DESCRIPTION OF THE DRAWINGS

Further advantages will become apparent from the description of the drawings hereinafter. The drawing shows three exemplary embodiments of the disclosure. The drawings, the description, and the claims contain numerous features in combination. The person skilled in the art will appropriately also consider the features individually and combine them to form further meaningful combinations.

The following are shown.

DETAILED DESCRIPTION

Figure 1:
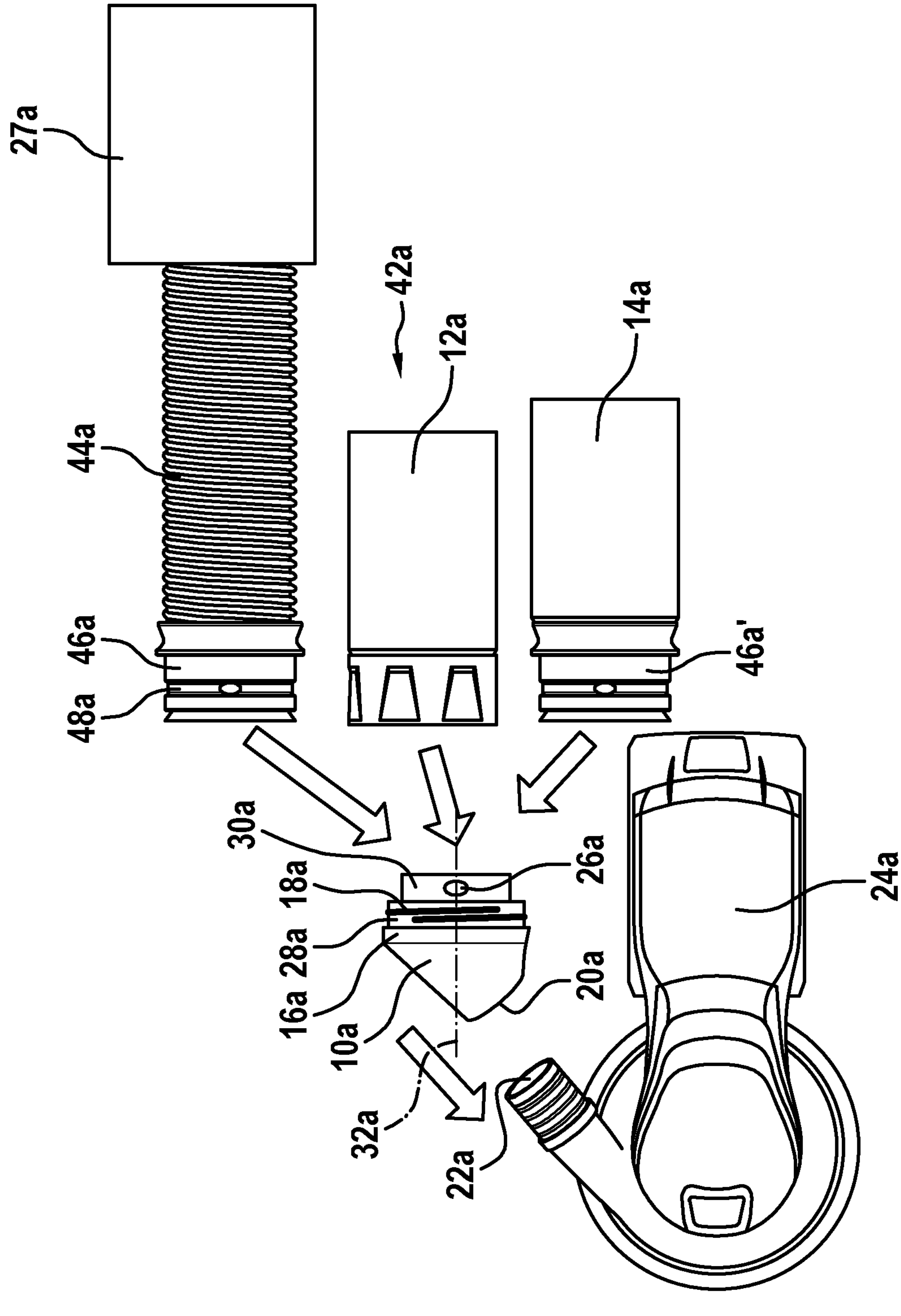
FIG. 1 a schematic representation of a hand-held power tool according to the disclosure and a lid apparatus according to the disclosure by means of which different material disposal units or material collection containers can be connected to the hand-held power tool.

FIG. 1 shows a hand-held power tool 24*a*. The hand-held power tool 24*a* is configured by way of example as a sander, in particular an eccentric, oscillating, or multi-sander. The hand-held power tool 24*a* is preferably provided in order to remove material from an object to be processed, in particular as a main function or as a side effect. The hand-held power tool 24*a* preferably comprises a discharge nozzle 22*a*. The discharge nozzle 22*a* is preferably provided in order to guide the removed material away from a work area of the hand-held power tool 24*a*. A center axis of the discharge nozzle 22*a* is preferably transverse, in particular at an angle of between 30° and 60°, to a longitudinal axis of the hand-held power tool 24*a*. Preferably, the center axis of the discharge nozzle 22*a* passes transverse to an application plane of the hand-held power tool 24*a*, which is provided for applying the hand-held power tool 24*a* to an object to be processed.

FIG. 1 shows a material collection apparatus 42*a* for a hand-held power tool 24*a*. The material collection apparatus 42*a* comprises a lid apparatus 10*a*. The material collection apparatus 42*a* in particular comprises a material collection container 12*a*. The material collection container 12*a* is provided in order to receive the material discharged by the hand-held power tool 24*a*. The material collection apparatus 42*a* is preferably provided so as to be fastened to the discharge nozzle 22*a* for entrainment with the hand-held power tool 24*a*. The lid apparatus 10*a* for the material collection container 12*a* comprises at least one lid unit 16*a* for at least partially closing a material collection opening of the material collection container 12*a*. The lid apparatus 10*a* comprises at least one container fixation interface 18*a* arranged on the lid unit 16*a*, by means of which the lid unit 16*a* can be reversibly detached and fastened, in particular without tools, on the material collection container 12. The lid apparatus 10*a* comprises at least one hand-held power tool interface 20*a* arranged on lid unit 16*a* for fastening the lid unit 16*a* to hand-held power tool 24*a*, particularly preferably on the discharge nozzle 22*a* of hand-held power tool 24*a*. The lid apparatus 10*a* comprises at least one further fixation interface 26*a*. By means of the further fixation interface 26*a*, a material disposal unit 27*a* can be reversibly detached and fastened to the lid unit 16*a*, in particular without tools.

For example, the material disposal unit 27*a* is a vacuum cleaner. Preferably, the material disposal unit 27*a* comprises a connector unit 44*a*. Preferably, the material disposal unit 27*a* comprises a connector unit 46*a*. The connector unit 46*a* of the material disposal unit 27*a* preferably comprises a tubular connection element, in particular a hose nozzle, which is fastened to the hose 44*a*. The connector unit 46*a* of the material disposal unit 27*a* preferably comprises a counter-interface 48*a* which, in cooperation with the further fixation interface 26*a*, fastens the material disposal unit 27*a* to the lid apparatus 10*a*. The counter-interface 48*a* is preferably arranged on the connection element. The container fixation interface 18*a* and the further fixation interface 26*a* are configured differently. The container fixation interface 18*a* is preferably configured as a threading, in particular as an external threading. Preferably, the further fixation interface 26*a* is configured as a snap-fit positive lock. The further fixation interface 26*a* forms a snap-fit unit. Preferably, the further fixation interface 26*a* comprises a female detent element, particularly preferably two female detent elements. The counter-interface 48*a* of the material disposal unit 27*a* preferably comprises a male detent element, particularly preferably two male detent elements, for snapping into the further fixation interface 26*a*. The counter-interface 48*a* preferably comprises an annular base body, from which the male detent elements radially protrude, in particular relative to a center axis, in particular a central hose axis, of the connector unit 46*a* of the material disposal unit 27*a*. The annular base body is preferably slotted in order to allow for an elastic deformation of the counter-interface 48*a*. The counter-interface 48*a* is preferably arranged rotatably on the connector element, in particular mounted about the center axis of the connector unit 46*a* of the material disposal unit 27*a*. Particularly preferably, in a state when the lid apparatus 10*a* is fastened to the material disposal unit 27*a* by means of the further fixation interface 26*a*, the lid apparatus 10*a* is rotatable relative to the hose 44*a*.

Alternatively or additionally, the material disposal unit 27*a* comprises a further material collection container 14*a* having a further connector unit 46*a*' analogously configured to the connector unit 46*a* of the material disposal unit 27*a*.

Figure 2:
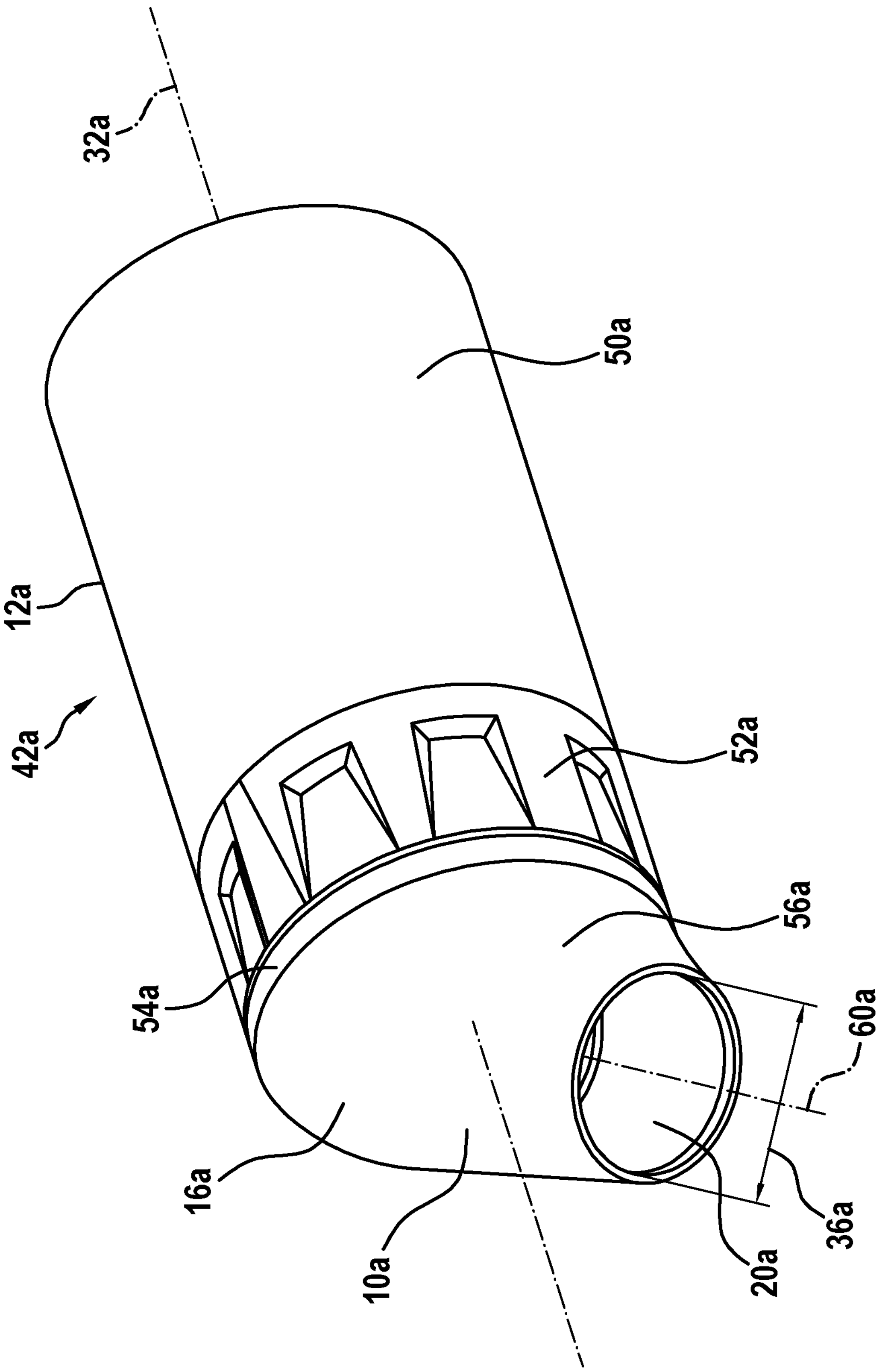
FIG. 2 a schematic representation of a material collection apparatus according to the invention with the lid apparatus according to the disclosure, FIG. 3 a schematic cross-section of a material collection apparatus according to the disclosure, FIG. 4 a schematic representation of the lid apparatus according to the disclosure, FIG. 5 a schematic representation of an alternative embodiment of a lid apparatus according to the disclosure, and FIG. 6 a schematic representation of a further alternative embodiment of a lid apparatus according to the disclosure.
Figure 3:
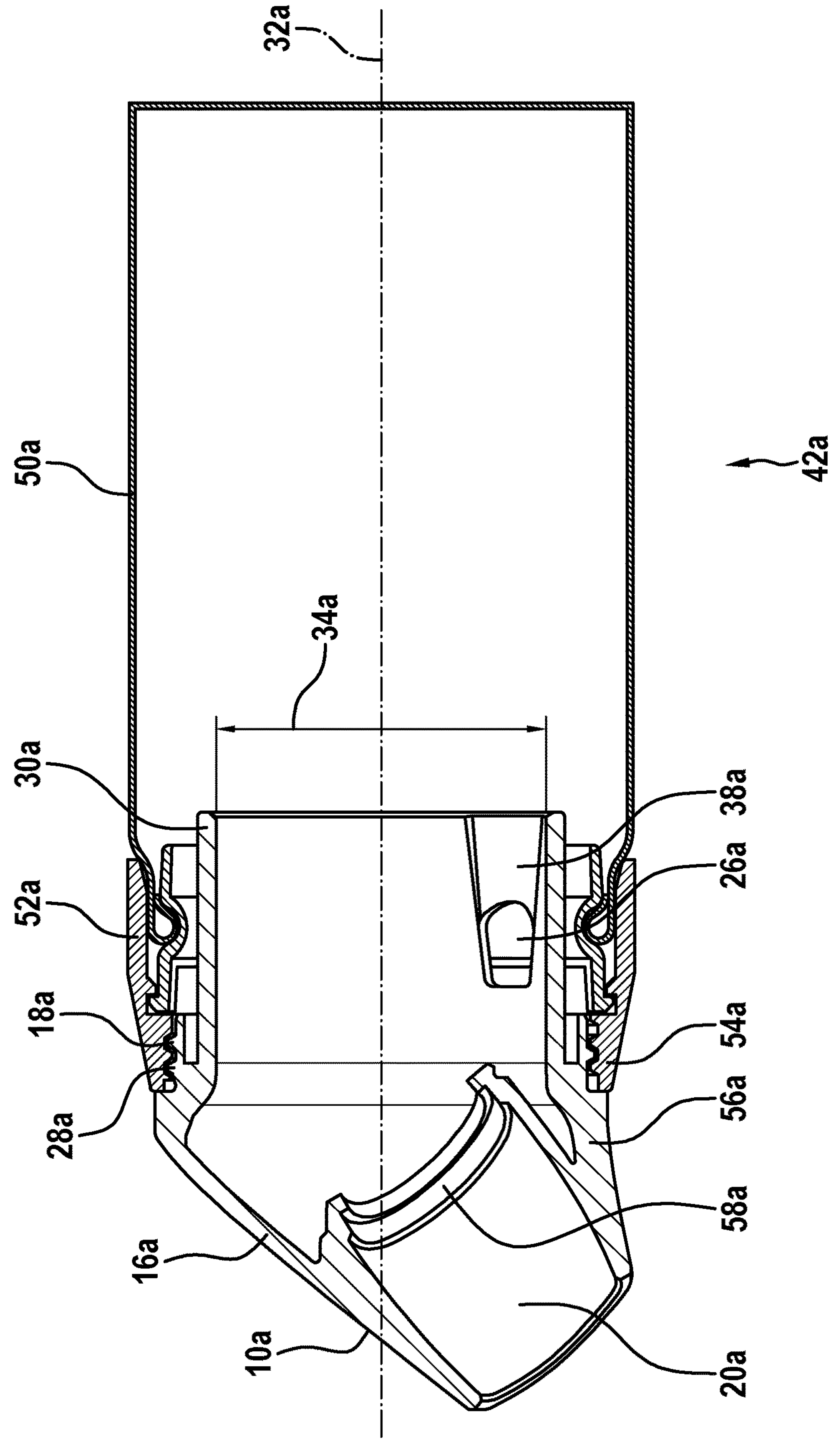

FIG. 2 shows the material collection apparatus 42*a* in a perspective view, and FIG. 3 shows a longitudinal section of the material collection apparatus 42*a*. Preferably, the material collection container 12*a* comprises a sump tank 50*a*. The sump tank 50*a* can be configured as a rigid box, in particular made of a thermoplastic, or as an in particular textile or foil-like bag. The material collection container 12*a* preferably comprises a connector unit 52*a*. The sump tank 50*a* is preferably arranged on the connector unit 52*a* of the material collection container 12*a*. The connector unit 52*a* preferably comprises a counter-interface, in particular an internal threading, to the container fixation interface 18*a*.

The lid apparatus 10*a* preferably comprises an inlet center axis 60*a*, which stands in particular perpendicularly on an inlet opening of the lid unit 16*a*, through which the material enters the lid apparatus 10*a*. The lid apparatus 10*a* preferably comprises an outlet center axis 32*a*, which stands in particular perpendicularly on an outlet opening of the lid unit 16*a*, through which the material exits the lid apparatus 10*a*. The outlet center axis 32*a* and the inlet center axis 60*a* preferably extend askew with respect to each other. In a state when arranged on the discharge nozzle 22*a* of the lid apparatus 20*a*, the outlet center axis 32*a* is arranged, particularly preferably alignably, preferably parallel to the longitudinal axis of the hand-held power tool 24*a*. The outlet center axis 32*a* is preferably provided so as to be arranged overlapping with a container longitudinal axis of the material collection container 12*a* or with the center axis of the material disposal unit 27*a*. The inlet center axis 60*a* is preferably provided so as to be arranged overlapping with the center axis of the discharge nozzle 22*a*.

The further fixation interface 26*a* is radially arranged within the container fixation interface 18*a* and axially spaced apart further from the hand-held power tool interface 20*a* than from the container fixation interface 18*a*. The lid unit 16*a* comprises a central wall 54*a* that is in particular cylindrical and circumferentially closed. On an outside of the central wall 54*a*, the lid unit 16*a* comprises a fixation wall portion 28*a*. The container fixation interface 18*a* is arranged on the fixation wall portion 28*a*. On an inner side of the central wall 54*a*, the lid unit 16*a* comprises a further fixation wall portion 30*a*. The further fixation interface 26*a* is arranged on the further fixation wall portion 30*a*. The fixation wall portions 28*a*, 30*a* are preferably cylindrical. Particularly preferably, the fixation wall portions 28*a*, 30*a* are concentrically arranged with respect to the outlet center axis 32*a*. The fixation wall portion 28*a* for the container fixation interface 18*a* has an axial extension that is less than an axial extension of the further fixation wall portion 30*a* for the further fixation interfaces 26*a*. The fixation wall portion 28*a* for the container fixation interface 18*a* has a radial distance from the outlet center axis 32*a* of the lid unit 16*a* that is greater than a radial distance of the further fixation wall portion 30*a* from the outlet center axis 32*a*. A minimum distance between the fixation wall portions 28*a*, 30*a* is less than a minimum distance of the fixation wall portion 28*a* and/or the further fixation wall portion 30*a* from the outlet center axis 32*a* of the lid unit 16*a*.

A maximum opening width 34*a* of the lid unit 16*a* to allow passage of the material bounded by the central wall 54*a* is greater than a maximum opening width 36*a* of the hand-held power tool interface 20*a*. The hand-held power tool interface 20*a* is preferably configured as a hollow cylinder that is arranged within the lid unit 16*a*. The lid unit 16*a* preferably comprises a hand-held power tool-side wall portion 56*a*. The hand-held power tool-side wall portion 56*a* extends from the central wall 54*a* in a direction facing away from the fixation wall portions 28*a*, 30*a*. The hand-power tool-side wall portion 56*a* is configured so as to conically taper starting from the central wall 54*a* in a direction parallel to the inlet center axis 60*a*. The hand-held power tool-side wall portion 56*a* preferably forms the inlet opening. The hand-held power tool interface 20*a* is preferably arranged on the hand-held power tool-side wall portion 56*a*. The hand-held power tool interface 20*a* preferably projects into the lid unit 16*a*, starting from the inlet opening. Preferably, the hand-held power tool interface 20*a* comprises an abutment element 58*a* for abutment of the discharge nozzle 22*a* parallel to the inlet center axis 60*a* at an end facing away from the inlet opening of a cylindrical base body of the hand-held power tool interface 20*a*. The abutment element 58*a* is preferably free-standing, in particular spaced apart from the central wall 54*a* of the hand-held power tool-side wall portion 56*a* and/or the fixation wall portions 28*a*, 30*a*.

Figure 4:
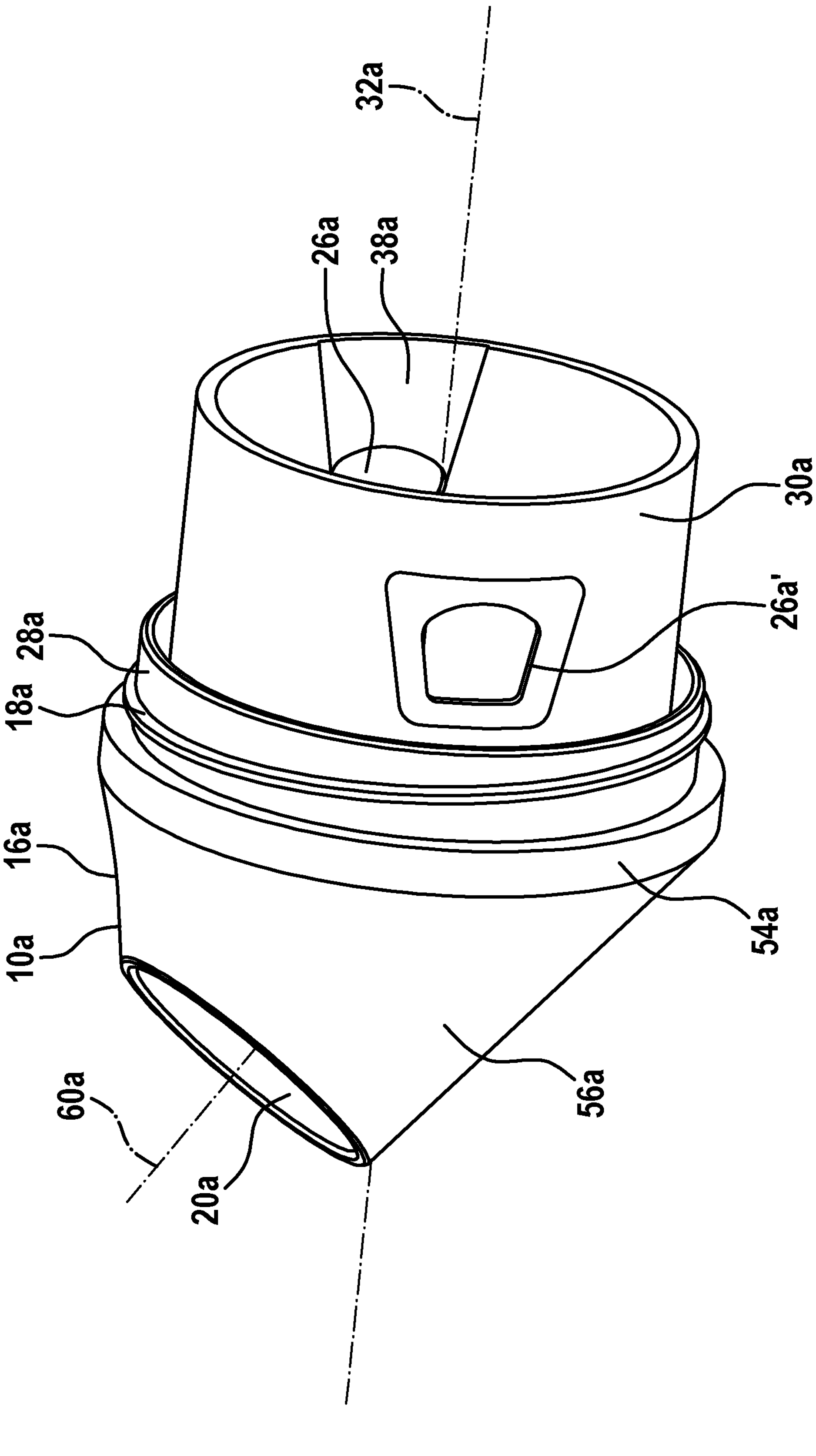

FIG. 4 shows the lid apparatus 10*a*. The lid apparatus 10*a* comprises at least one guide groove 38*a*, which leads from an opening plane of the lid unit 16*a* perpendicular to the outlet center axis 32*a* to the further fixation interface 26*a*. The guide groove 38*a* is preferably arranged as a trapezoidal recess on an inner side of the further fixation wall portion 38*a*.

Figure 5:
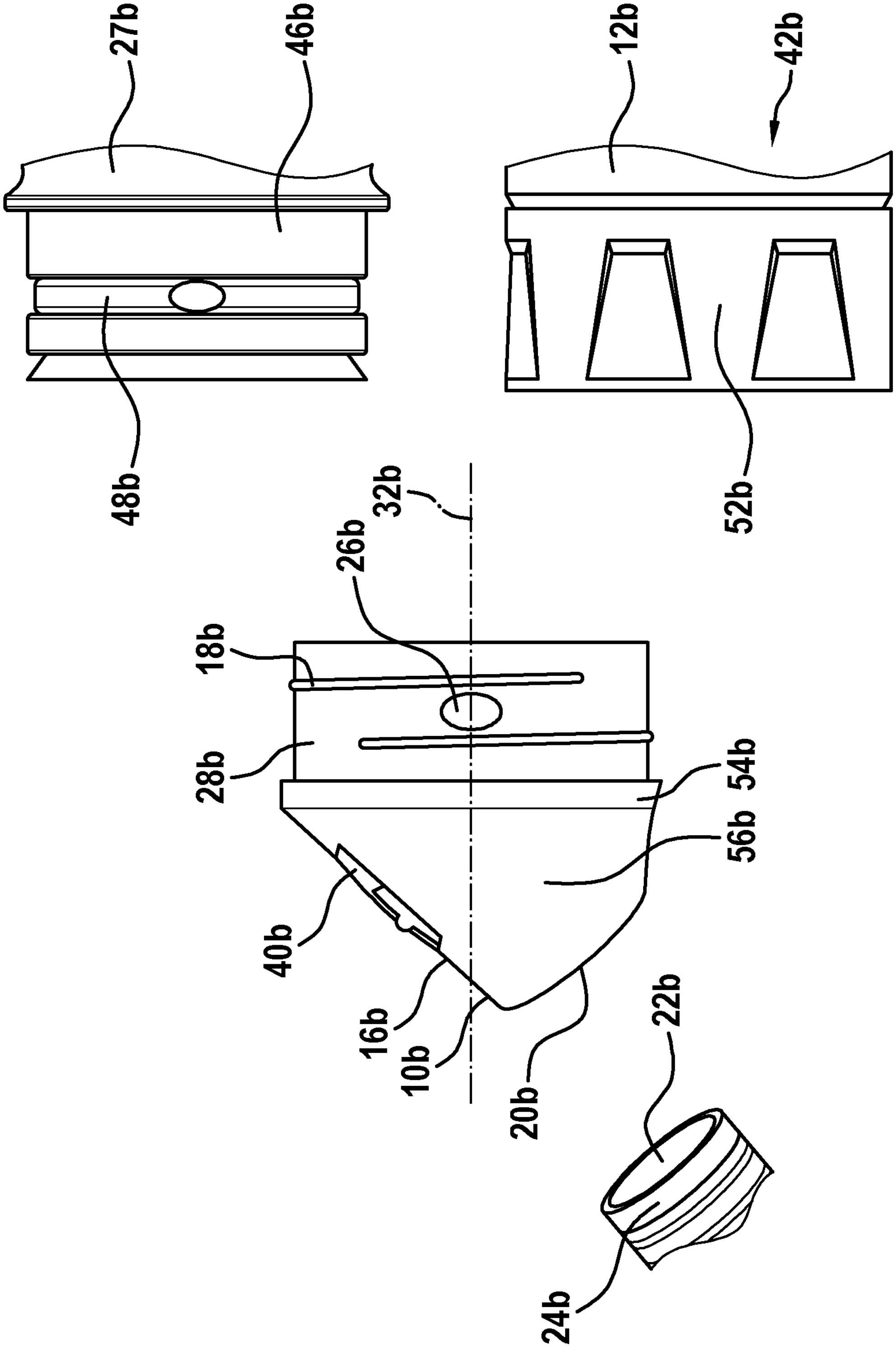
Figure 6:
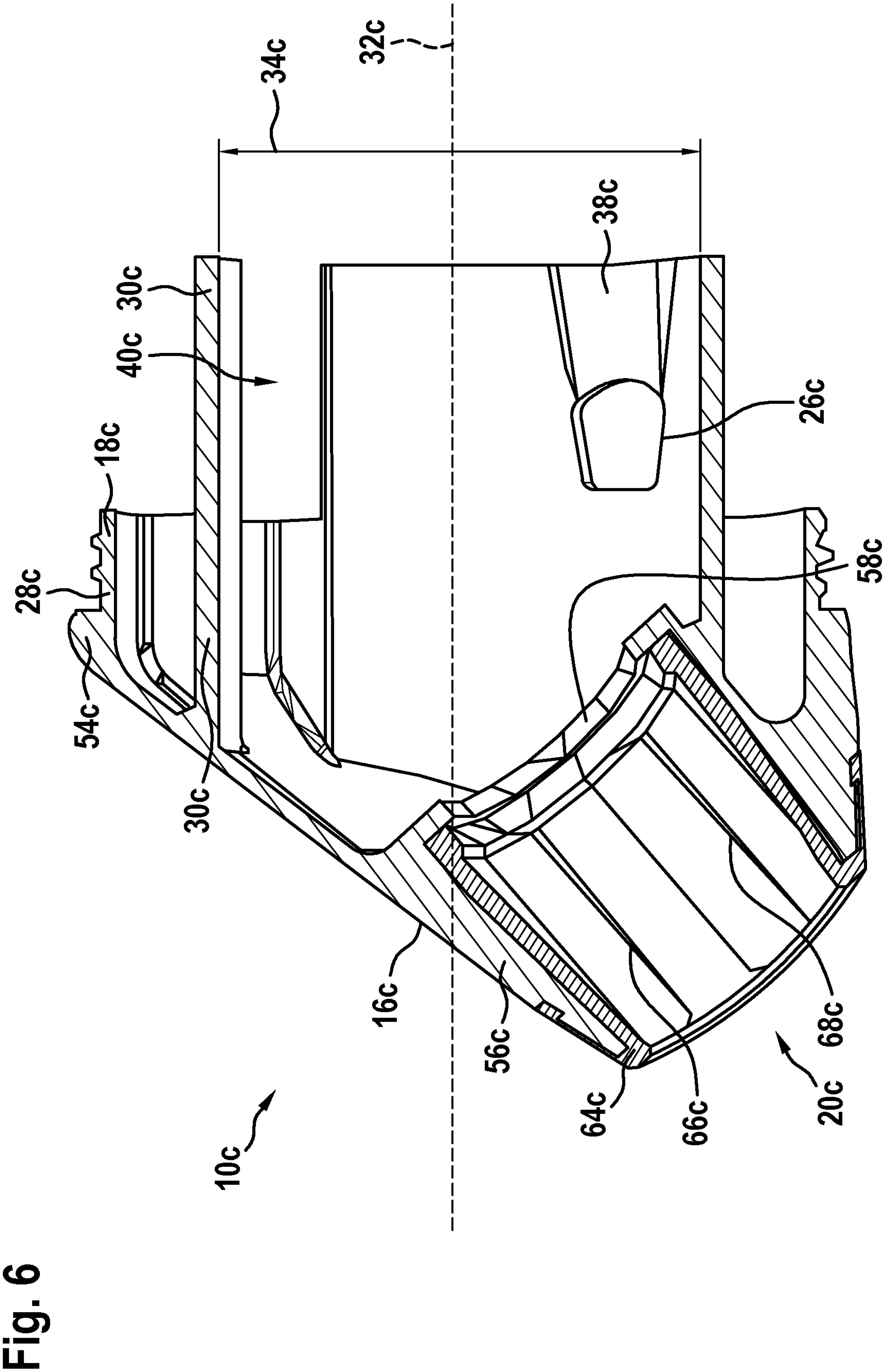

FIGS. 5 and 6 show further exemplary embodiments of the disclosure. The following descriptions and the drawings are essentially limited to the differences between the exemplary embodiments, wherein reference can, in principle, also be made, with respect to identically designated components, in particular with respect to components having the same reference numbers, to the drawings and/or the description of the other exemplary embodiments, in particular FIGS. 1 to 4. In order to distinguish the exemplary embodiments, the letter a is appended to the reference numbers of the exemplary embodiment in FIGS. 1 to 4. In the design examples of FIGS. 5 and 6, the letter a has been replaced by the letters b or c.

FIG. 5 shows a lid apparatus 10*b* for a material collection container 12*b*. The lid apparatus 10*b* comprises at least one lid unit 16*b* for at least partially closing a material collection opening of the material collection container 12*b*. The lid apparatus 10*b* comprises at least one container fixation interface 18*b* arranged on the lid unit 16*b*, by means of which the lid unit 16*b* can be reversibly detached and fastened, in particular without tools, to the material collection container 12*b*. The lid apparatus 10*b* comprises at least one hand-held power tool interface 20*b* arranged on lid unit 16*b* for fastening the lid unit 16*b* to a hand-held power tool 24*b*, particularly preferably on a discharge nozzle 22*b* of hand-held power tool 24*b*. The lid apparatus 10*b* comprises at least one further fixation interface 26*b*. By means of the further fixation interface 26*b*, a material disposal unit 27*b* can be reversibly detached and fastened to the lid unit 16*b*, in particular without tools.

The lid apparatus 10*b* comprises a substantially circumferentially closed fixation wall portion 28*b* on which the container fixation interface 18*b* and the further fixation interface 26*b* are arranged on different sides. The container fixation interface 16*b* is preferably configured as an external threading. The further fixation interface 26*b* preferably comprises two female detent elements, which are provided for receiving male detent elements of a counter-interface 48*b* of the material disposal unit 27*b* from the direction of an inlet center axis 32*b* of the lid unit 16*b*. Particularly preferably, on an inner side of the fixation wall portion 28*b*, a respective guide groove for the female detent elements of the further fixation interface 26*b* is inset.

The lid apparatus 10*b* comprises an adjustable air bypass 40*b* for adjusting a flow resistance of the lid unit 16*b*. The air bypass 40*b* is preferably formed by a hand-held power tool-side wall portion 56*b* of the lid unit 16*b*.

With respect to further features of the lid apparatus 10*b*, reference is made in particular to FIGS. 1 to 4 and their description. The air bypass 40*b* is not limited to the configuration of the fixation wall portion 28*b* shown in FIG. 5 and can also be integrated into the lid apparatus 10*a* of FIGS. 1 to 4.

FIG. 6 shows a lid apparatus 10*c* for a material collection container. The lid apparatus 10*c* comprises at least one lid unit 16*c* for at least partially closing a material collection opening of the material collection container. The lid apparatus 10*c* comprises at least one container fixation interface 18*c* arranged on the lid unit 16*c*, by means of which the lid unit 16*c* can be reversibly detached and fastened, in particular without tools, on the material collection container. The lid apparatus 10*c* comprises at least one hand-held power tool interface 20*c* arranged on lid unit 16*c* for fastening the lid unit 16*c* to a hand-held power tool, particularly preferably on a discharge nozzle of hand-held power tool. The lid apparatus 10*c* comprises at least one further fixation interface 26*c*. By means of the further fixation interface 26*c*, a material disposal unit can be reversibly detached and fastened to the lid unit 16*c*, in particular without tools.

The lid apparatus 10*c* preferably comprises a substantially circumferentially closed fixation wall portion 28*c* on which the container fixation interface 18*c* is arranged. The lid apparatus 10*c* comprises a substantially circumferentially closed further fixation wall portion 30*c* on which the further fixation interface 26*c* is arranged. The further fixation wall portion 30*c* forms an air bypass 40*c*. The air bypass 40*c* is preferably formed by a slit-shaped recess of the further fixation wall portion 30*c*. The recess extends here, by way of example, from an outlet opening of the lid apparatus 10*c* over an entire longitudinal extension of the further fixation wall portion 30*c*, in particular up to an inner wall of a hand-held power tool-side wall portion 56*c* of the lid apparatus 10*c*, from which the further fixation wall portion 30*c* projects. The air bypass 40*c* is preferably formed spaced apart from the further fixation interface 26*c*. The air bypass 40*c* is in particular arranged on one side of the further fixation wall portion 30*c* opposite an outlet center axis 32*c* at the hand-held power tool interface 20*c*.

The hand-held power tool interface 20*c* comprises a base body of a base material. The base body is preferably formed integrally with the hand-held power tool-side wall portion 56*c*. The base body preferably comprises a hollow cylindrical connector element, in particular for receiving the discharge nozzle of the hand-held power tool. The hand-held power tool interface 20*c* comprises at least one fastening element 64*c* arranged on the base body of an in particular thermoplastic elastomeric material that is different from the base material.

The fastening element 64*c* forms a substantially circumferentially closed inner lining of the base body, in particular of the connector element. The fastening element 64*c* preferably forms a sleeve that is arranged within the connector element. For example, the fastening element 64*c* forms an anchor arranged on the sleeve, which projects out of the connector element and is arranged in particular on an outer wall of the hand-held power tool-side wall portion 56*c*, in particular in a positive locking manner. The fastening element 64*c* is preferably arranged on the base body by over-molding the base body.

The hand-held power tool interface 20*c* comprises at least one contact element 66*c*, 68*c* made of an electrically conductive material, in particular a carbon fiber-reinforced plastic, for dissipating an electrostatic charge. The at least one contact element 66*c*, 68*c* is preferably formed as a bar. The contact element 66*c*, 68*c* preferably projects out of an inner wall of the base body. Preferably, the at least one contact element 66*c*, 68*c* is/are configured integrally with the base body. Preferably, a base material from which the base body is manufactured is equal to the electrically conductive material, in particular the carbon fiber-reinforced plastic, of the at least one contact element 66*c*, 68*c*. As a result, an electrical charge can advantageously be passed or dissipated to a vacuum cleaner hose via the further fixation interface 26*c*. The fastening element 64*c* preferably has at least one recess through which the contact element 66*c*, 68*c* projects or is made accessible for direct physical contact with the hand-held power tool.

With respect to further features of the sensor apparatus 10*c*, reference is made in particular to FIGS. 1 to 5 and their description. The air bypass 40*c* is not limited to the configuration of the further fixation wall portion 30*c* shown in FIG. 6 and can also be integrated into the lid apparatuses 10*a*, 10*b* of FIGS. 1 to 5. The fastening element 64*c* is not limited to the combination with the air bypass 40*c* shown in FIG. 6, and can also be incorporated into the lid apparatuses 10*a*, 10*b* of FIGS. 1 to 5.

The invention claimed is:

1. A lid apparatus for a material collection container, the lid apparatus comprising:

at least one lid unit configured to at least partially close a material collection opening of the material collection container;

at least one container fixation interface arranged on the lid unit and configured to reversibly detach and fasten the lid unit on the material collection container;

at least one hand-held power tool interface arranged on the lid unit and configured to fasten the lid unit on a hand-held power tool; and at least one further fixation interface configured to reversibly detach and fasten a material disposal unit, wherein the further fixation interface is arranged radially within the container fixation interface and is axially spaced apart further from the hand-held power tool interface than from the container fixation interface.

2. A lid apparatus for a material collection container, the lid apparatus comprising:

at least one lid unit configured to at least partially close a material collection opening of the material collection container;

at least one container fixation interface arranged on the lid unit and configured to reversibly detach and fasten the lid unit on the material collection container;

at least one hand-held power tool interface arranged on the lid unit and configured to fasten the lid unit on a hand-held power tool;

at least one further fixation interface configured to reversibly detach and fasten a material disposal unit; and a substantially circumferentially closed fixation wall portion, the container fixation interface and the further fixation interface being arranged on different sides of the fixation wall portion.

3. A lid apparatus for a material collection container, the lid apparatus comprising:

at least one lid unit configured to at least partially close a material collection opening of the material collection container;

at least one container fixation interface arranged on the lid unit and configured to reversibly detach and fasten the lid unit on the material collection container;

at least one hand-held power tool interface arranged on the lid unit and configured to fasten the lid unit on a hand-held power tool; and at least one further fixation interface configured to reversibly detach and fasten a material disposal unit, wherein:

the lid unit comprises a cylindrical, circumferentially closed central wall, a fixation wall portion for the container fixation interface is arranged outside the central wall, and a further fixation wall portion for the further fixation interfaces is arranged inside the central wall.

4. The lid apparatus according to claim 3, wherein:

the fixation wall portion has an axial extension that is less than a further axial extension of the further fixation wall portion, and/or the fixation wall portion is spaced apart from an outlet center axis of the lid unit by a radial distance that is greater than a further radial distance from the further fixation wall portion.

5. The lid apparatus according to claim 4, wherein a minimum distance between the fixation wall portion and the further fixation wall portion is less than a minimum distance from at least one of the fixation wall portion and the further fixation wall portion from the outlet center axis of the lid unit.

6. A lid apparatus for a material collection container, the lid apparatus comprising:

at least one lid unit configured to at least partially close a material collection opening of the material collection container;

at least one container fixation interface arranged on the lid unit and configured to reversibly detach and fasten the lid unit on the material collection container:

at least one hand-held power tool interface arranged on the lid unit and configured to fasten the lid unit on a hand-held power tool; and at least one further fixation interface configured to reversibly detach and fasten a material disposal unit, wherein the container fixation interface and the further fixation interface are configured differently.

7. The lid apparatus according to claim 6, wherein the hand-held power tool interface comprises at least one contact element, which is made of an electrically conductive material such that the at least one contact element dissipates electrostatic charge.

8. The lid apparatus according to claim 7, wherein the electrically conductive material is a carbon fiber-reinforced plastic.

9. The lid apparatus according to claim 6, wherein:

the at least one container fixation interface is configured to reversibly detach and fasten the lid unit on the material collection container without tools;

the at least one hand-held power tool interface is configured to fasten the lid unit on a discharge nozzle of the hand-held power tool; and the at least one further fixation interface is a snap-fit unit configured to reversibly detach the material disposal unit without tools.

10. The lid apparatus according to claim 6, wherein the container fixation interface is configured as an external threading, and the further fixation interface is configured as a snap-fit positive lock.

11. A material disposal unit comprising:

the lid apparatus according to claim 6, wherein the material disposal unit is a vacuum cleaner having a vacuum cleaner hose nozzle.

12. A lid apparatus for a material collection container, the lid apparatus comprising:

at least one lid unit configured to at least partially close a material collection opening of the material collection container;

at least one container fixation interface arranged on the lid unit and configured to reversibly detach and fasten the lid unit on the material collection container;

at least one hand-held power tool interface arranged on the lid unit and configured to fasten the lid unit on a hand-held power tool;

at least one further fixation interface configured to reversibly detach and fasten a material disposal unit; and at least one guide groove leading from an opening plane of the lid unit to the further fixation interface.

13. A lid apparatus for a material collection container, the lid apparatus comprising:

at least one lid unit configured to at least partially close a material collection opening of the material collection container;

at least one container fixation interface arranged on the lid unit and configured to reversibly detach and fasten the lid unit on the material collection container;

at least one hand-held power tool interface arranged on the lid unit and configured to fasten the lid unit on a hand-held power tool;

at least one further fixation interface configured to reversibly detach and fasten a material disposal unit; and an adjustable air bypass configured to adjust a flow resistance of the lid unit.

14. A lid apparatus for a material collection container, the lid apparatus comprising:

at least one lid unit configured to at least partially close a material collection opening of the material collection container;

at least one container fixation interface arranged on the lid unit and configured to reversibly detach and fasten the lid unit on the material collection container;

at least one hand-held power tool interface arranged on the lid unit and configured to fasten the lid unit on a hand-held power tool;

at least one further fixation interface configured to reversibly detach and fasten a material disposal unit; and a substantially circumferentially closed fixation wall portion on which at least one of the container fixation interface and the further fixation interface is arranged and which forms an air bypass.

15. A lid apparatus for a material collection container, the lid apparatus comprising:

at least one lid unit configured to at least partially close a material collection opening of the material collection container;

at least one container fixation interface arranged on the lid unit and configured to reversibly detach and fasten the lid unit on the material collection container;

at least one hand-held power tool interface arranged on the lid unit and configured to fasten the lid unit on a hand-held power tool; and at least one further fixation interface configured to reversibly detach and fasten a material disposal unit, wherein the hand-held power tool interface comprises:

a base body formed of a base material; and at least one fastening element arranged on the base body and that is made from a thermoplastic elastomer that is different from the base material.

16. The lid apparatus according to claim 15, wherein the fastening element forms a substantially circumferentially closed inner lining of the base body.

17. A material collection apparatus for a hand-held power tool comprising:

the lid apparatus according to claim 6; and the material collection container, which is configured to receive material discharged by the hand-held power tool.

18. A hand-held power tool comprising the material collection apparatus according to claim 17.

19. The hand-held power tool according to claim 18, wherein the hand-held power tool is an eccentric, oscillating, or multi-sander.

* * * * *